Feb. 6, 1968  J. G. LEWIS  3,367,342
METHOD AND APPARATUS FOR THRESHING LEAVES, E.G. TOBACCO LEAVES
Filed Feb. 21, 1966
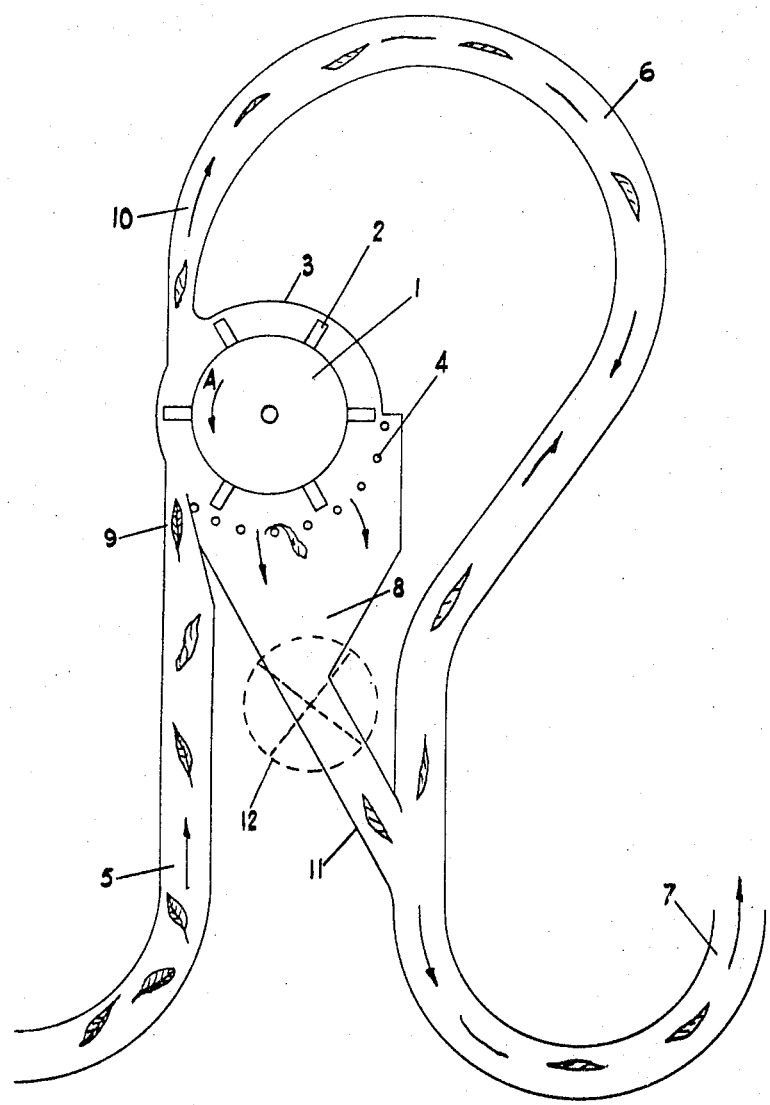

United States Patent Office 3,367,342
Patented Feb. 6, 1968

3,367,342
METHOD AND APPARATUS FOR THRESHING LEAVES, E.G. TOBACCO LEAVES
James G. Lewis, Wrington, England, assignor to The Imperial Tobacco Company (of Great Britain and Ireland) Limited, Bedminster, Bristol, England, a company of England
Filed Feb. 21, 1966, Ser. No. 529,147
Claims priority, application Great Britain, Mar. 18, 1965, 11,455/65
10 Claims. (Cl. 131—145)

This invention relates to a method of and apparatus for threshing leaves, e.g. tobacco leaves. Threshing of leaves is a process in which the lamina is torn from the stem, which stem and lamina may be subsequently sorted and delivered to different destinations. Further threshing of the lamina is normally required to remove all stem.

In a typical thresher the leaves may be delivered to a rotating beater that acts to tear the lamina from the stems whilst the leaves are restrained by bars or the like.

It has been found that if the lamina is torn from the stem in a direction roughly parallel to said stem, the lamina will be removed in comparatively large pieces substantially free from bits of stem. Furthermore, it has been found that if the direction of tearing is from tip to butt, the threshed stem is comparatively free from small pieces of lamina, but if the lamina is torn from butt to tip a substantial amount of ragged pieces of lamina remain on the stem.

According therefore to one aspect of the present invention, a method of threshing leaves, e.g. tobacco leaves, comprises directing the leaves to a thresher with the stems of the leaves parallel with the line of relative movement between the thresher and the leaves and with the tips of the leaves foremost.

Preferably the leaves are directed to the thresher pneumatically and in a vertically upward direction whereby gravity assists in turning the leaves tip foremost. In the preferred method the leaves are directed through a throat of reduced cross sectional area to assist in orienting the leaves tip foremost.

According to a further aspect of the present invention, there is provided apparatus for threshing leaves to separate the stem and lamina thereof comprising a thresher and means for directing the leaves to the thresher with the stems of the leaves parallel with the line of relative movement between the thresher and the leaves and with the tips of the leaves foremost.

The apparatus preferably comprises means for feeding the leaves pneumatically and in a vertically upward direction whereby gravity assists in turning the leaves tip foremost.

Preferably there is provided a throat of reduced cross sectional area through which the leaves are fed pneumatically to assist in orienting them tip foremost.

The thresher may comprise a rotating beater having beater element wheels move against the direction of flow of said leaves to thresh them. Thus the thresher may be housed within a generally cylindrical housing, the leaves being fed tangentially thereto and away therefrom. Preferably the lower portion of said housing is provided with a grid of bars through which some leaves pass to receive a second threshing.

An embodiment of the present invention is diagrammatically indicated in the accompanying drawing which shows an elevational view of apparatus according to the present invention.

The apparatus shown includes a thresher comprising a drum 1 having teeth 2 projecting at spaced intervals radially from its periphery, said drum rotating in the direction of the arrow A. The drum is housed within a cylindrical housing, the upper portion of which is provided by a wall 3 while a plurality of bars 4 provide the lower portion thereof. The bars 4 provide a secondary grid means for threshing the leaves as will be hereinafter described.

A duct 5 is provided for feeding leaves pneumatically to the thresher. A delivery duct 6 withdraws threshed leaf lamina and stems from the thresher and leads to an outlet duct 7. From outlet 7, the lamina and stem pass to a mechanism (not shown) for sorting the stems from lamina.

The bars 4 lead to a passageway 8 that also directs threshed stems and lamina to the said outlet 7.

The ducts 5 and 6 are of generally rectangular cross-section. It will be seen that at 9 the feeding duct 5 is provided with a throat of reduced cross-sectional area, while at 10 (the start of the delivery duct 6) the cross-section is somewhat greater than at 9 and said cross-section gradually increases in area until it assumes the same area as that at the feed duct 5, continuing thus down to the outlet 7. The throat at 9 increases the kinetic energy of the air upstream of the thresher, whilst after the thresher, the gradual increase of cross-section recovers part of the kinetic energy of the air stream and economizes the fan power required to operate the penumatic system.

The apparatus works in the following manner:

The outlet 7 is connected to a suitable fan for drawing a current of air into the feed duct 5 and out through the duct 6 and passageway 8.

A supply of whole leaves is delivered to the vertically arranged duct 5 through which they pass pneumatically. As the leaves rise up said duct they tend to orient themselves tip uppermost or foremost. This is due to the fact that the centre of area of a whole leaf is nearer the tip than is its centre of mass, due to the position of the relatively heavy butt end of the stem. As they approach the throat 9, where the air velocity increases, frictional forces exerted on the leaves act to accelerate the leaves and further to arrange the leaves parallel to the air stream with their tips uppermost or foremost.

The leaves are then threshed by the teeth 2 that act to tear the lamina from the stem. Some of the threshed stem and lamina pass through the opening 10 into the duct 6 and pass out of the outlet 7, while other leaves receive a secondary threshing between the teeth 2 and bars 4 whereupon the lamina and stems thus provided pass through the passageway 8 and pipe 11 to the outlet 7.

In some instances, if the air velocity is sufficiently high, the thresher teeth may be maintained stationary, or may be rotated slowly in the same direction as the air stream. This is contrary to that shown in the drawing in which the drum rotates in the direction opposite to that of the air stream.

In some instances it may also be necessary to install a rotary valve or air lock in the pipe 11 since sufficient pressure difference may exist between the passages 7 and 8 to prevent the free flow of leaf from the passageway 8 to the outlet 7. Such a valve is shown dotted at 12, it being understood that the passageway 8 and pipe 11 would be shaped to accommodate the valve.

In some instances it may be desirable to omit the bars 4. In this case after separating threshed lamina the unthreshed leaves would be passed to a similar second stage thresher with or without bars 4 or alternatively to a conventional thresher as used hitherto.

By the use of apparatus in accordance with the present invention, much more efficient threshing is achieved. Ideally one would like to remove the lamina in, say, two halves and leave the stem quite clean. With the present arrangement it has been found that the lamina is separated from the stem leaving only a small amount on the stem, and the lamina so separated is quite large, i.e. breakage of the lamina into small pieces is reduced to a minimum.

Thus threshing the leaves in accordance with the present invention results in a considerable saving in costs. In a conventional thresher, where leaves are fed randomly, those beaten transversely of the stem simply break into two halves with little if any separation of the lamina from the leaf and those beaten parallel with the stem but from butt to tip, result in large amounts of lamina being left on the stem and the lamina tending to break up. With the present invention the stems are left acceptably clean and the lamina is in large pieces. Thus a more acceptable product is obtained. Use of the invention may also result in a reduction in the number of threshers employed in any given threshing line with a consequent considerable reduction in capital outlay and running costs. Thus normally more than one threshing is required to remove all stem from leaf, and the more efficiently this is done, the fewer number of threshers will be required to achieve a given degree of separation of lamina and stem.

I claim:

1. A method of threshing leaves to separate the stem and lamina thereof comprising directing the leaves through a duct, orienting said leaves in the duct with the stems generally parallel to each other and with the tips extending foremost by passing an accelerating current of air through said duct, and passing said directed leaves into a threshing drum, whereby the action of the accelerating current upon the leaves assists in turning the stems rearward so that the leaves enter the thresher drum with the tips of the leaves foremost.

2. A method as claimed in claim 1 wherein the said duct extends in a generally upward direction and wherein the leaves move through the duct in a generally upward direction whereby the action of gravity upon the heavier stems of the leaves assists in turning the stems downward so that the leaves enter the thresher with the tips of the leaves foremost.

3. A method as claimed in claim 2 comprising directing the leaves through a throat of reduced cross sectional area to assist in orienting the leaves tip foremost.

4. Apparatus for threshing leaves to separate the stem and lamina thereof comprising a thresher and pneumatic means for directing the leaves through an elongated duct to the thresher with the stems of the leaves substantially parallel with the line of relative movement between the thresher and the leaves and with the tips of the leaves foremost.

5. Apparatus as claimed in claim 4 comprising means for feeding the leaves in a generally upward direction whereby gravity assists in turning the leaves tip foremost.

6. Apparatus as claimed in claim 5 including a throat of reduced cross sectional area through which the leaves are fed pneumatically to assist in orienting them tip foremost.

7. Apparatus as claimed in claim 4 wherein said thresher comprises a rotating beater having beater elements which move against the direction of flow of said leaves to thresh them.

8. Apparatus as claimed in claim 7 comprising a generally cylindrical housing within which said thresher is housed, the leaves being fed tangentially thereto and away therefrom.

9. Apparatus as claimed in claim 8 wherein the lower portion of said housing is provided with a grid of bars through which some leaves pass to receive a second threshing.

10. Apparatus as claimed in claim 8 including a common duct which all threshed leaves enter for feeding away from the thresher.

References Cited

UNITED STATES PATENTS

| 919,297 | 4/1909 | Salomon | 131—145 |
| 1,003,951 | 9/1911 | Salomon | 131—145 X |
| 1,879,016 | 9/1932 | Austin | 131—146 |
| 2,184,567 | 12/1939 | Rundell | 131—145 X |
| 2,188,307 | 1/1940 | Patterson | 131—123 |
| 2,398,450 | 4/1946 | Rundell | 131—129 |
| 3,043,315 | 7/1962 | Verhappen | 131—146 |

FOREIGN PATENTS 687,409  1/1940  Germany.

ALDRICH F. MEDBERY, *Primary Examiner.*